United States Patent [19]

Ueda et al.

[11] 4,101,917
[45] Jul. 18, 1978

[54] EXCHANGEABLE LENSES FOR SINGLE LENS REFLEX CAMERAS

[75] Inventors: Hiroshi Ueda, Nara; Shuzo Matsushita, Ikeda, both of Japan

[73] Assignee: Minolta Camera Kabushiki Kaisha, Osaka, Japan

[21] Appl. No.: 800,875

[22] Filed: May 26, 1977

[30] Foreign Application Priority Data

Jun. 7, 1976 [JP] Japan .................................. 51-65626

[51] Int. Cl.$^2$ .............................................. G03B 9/02
[52] U.S. Cl. .................................... 354/273; 354/46; 354/289
[58] Field of Search ............... 354/46, 60 R, 286, 288, 354/289, 202, 273

[56] References Cited

U.S. PATENT DOCUMENTS

| | | | |
|---|---|---|---|
| 3,461,783 | 8/1969 | Fujii | 354/46 X |
| 3,486,434 | 12/1969 | Suzuki et al. | 354/46 X |
| 3,683,765 | 8/1972 | Iura | 354/46 |
| 3,699,868 | 10/1972 | Shimomura | 354/46 |
| 4,000,498 | 12/1976 | Tunekawa et al. | 354/60 R X |

Primary Examiner—Donald A. Griffin
Assistant Examiner—William B. Perkey
Attorney, Agent, or Firm—Watson, Cole, Grindle & Watson

[57] ABSTRACT

Disclosed are exchangeable lenses for use in single lens reflex cameras which include a diaphragm setting ring having an indicia for automatic aperture control and an aperture scale for manual aperture setting thereon, the scale extending from a mininum $f$-number to a maximum $f$-number of the respective lenses. The diaphragm setting ring is able to set to a desired $f$-number position within the scale or set to the indicia. The diaphragm setting ring is provided with a single information transmitting member whose position relative to the aperture scale is such that the member may transmit information as to the step-difference between a desired set $f$-number and the minimum $f$-number, by coupling with an information receiving member on a camera body, to an exposure indicating and/or control mechanisms in the camera body when the ring is set to any one of the manual aperture setting positions, and in such a position relative to the indicia that the member may also transmit information as to the minimum $f$-number of the lens through the same coupling to the camera body mechanism when the ring is set to an automatic aperture control position. Without any other information transmitting and receiving members, the cameras utilizing these lenses are capable of receiving information as to the minimum $f$-number of the lens mounted on their body upon automatic diaphragm control and thus the cameras may indicate an $f$-number corresponding to aperture to be automatically controlled before commencement of a stopping-down operation.

6 Claims, 5 Drawing Figures

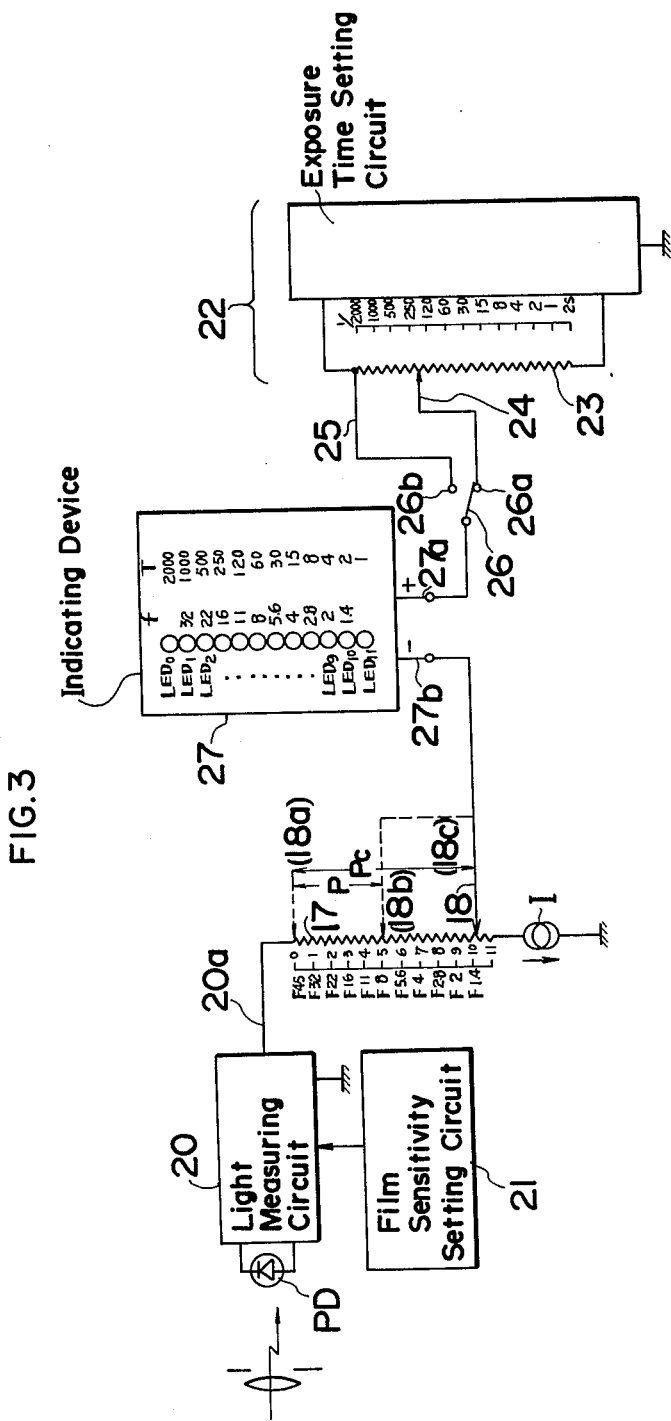

EXCHANGEABLE LENSES FOR SINGLE LENS REFLEX CAMERAS

BACKGROUND OF THE INVENTION

The present invention relates to a single lens reflex camera exchangeable lens, and more particularly to an exchangeable lens for use in the camera with T.T.L. light measurement type in which a shutter speed and a diaphragm aperture may be automatically selectively controlled and in which values of exposure factors to be automatically controlled may be indicated prior to the commencement of a stopping down operation.

With a so-called diaphragm-priority-automatic-shutter-speed-control camera in which the shutter speed is automatically controlled, the shutter speed to be controlled may be indicated with a fully open diaphragm aperture, i.e., prior to a stopping-down operation, only if information as to the difference in step between a minimum $f$-number for the lens and the preset $f$-number, an output of the light measurement and the information as to the film sensitivity are fed to a computing unit in the camera.

In contrast, with a shutter speed-priority-automatic-diaphragm-control camera in which a diaphragm may be automatically controlled, the $f$-number to be automatically controlled cannot be indicated prior to a stopping-down operation unless information as to the minimum $f$-number of the exchangeable lens mounted on the camera body is given. With the shutter-speed-priority-automatic-diaphragm control camera, it has been the general practice to separately provide a special member to transmit information as to the minimum $f$-number for the exchangeable lens to the camera body and to position this special member between the exchangeable lens and the camera body to thereby provide an indication of the $f$-number to be controlled prior to a stopping-down operation.

Positioning of this member which transmits information as to the minimum $f$-number on a lens barrel requires an additional provision of the transmitting member being adapted to transmit the difference in step between the minimum $f$-number for the lens and a preset $f$-number, or requires another transmitting member to transmit a preset $f$-number. Thus, many transmitting members have to be provided on a lens barrel for an exchangeable lens in order to provide these functions.

Generally, the majority of the peripheral portion of a joint surface of an exchangeable lens, for example a bayonet joint, which is to be mounted on a camera body is occupied by optical parts such as lenses and parts associated therewith, such that spatial difficulties arise in positioning many transmitting members in the aforesaid peripheral portion. The provision of additional transmitting members poses a critical problem for the manufacturer of the camera who has supplied specific type bayonets in the market for long periods of time as an old type exchangeable lens can no longer be mounted on a new type camera body, while a new type exchangeable lens cannot be mounted on an old type camera body.

In addition, from an optical viewpoint, the use of many transmitting members should be avoided as their use tends to impose sacrifices and limitations on the optical performance of the exchangeable lens due to addition of new factors in the bayonet portion.

SUMMARY OF THE INVENTION

It is therefore an object of the present invention to provide an exchangeable lens for use in a camera which tends to avoid the aforesaid shortcomings and suppress or eliminate the causes for such shortcomings.

It is another object of the present invention to provide an exchangeable lens for use in a camera in which the minimum $f$-number for the lens required for indicating a $f$-number corresponding to an aperture value to be automatically controlled in an automatic diaphragm control camera may be transmitted to the camera body through the medium of a conventional information-transmitting member which is also adapted to transmit the difference in step between the minimum $f$-number of the lens and a preset $f$-number without changing the optical performance of exchangeable lenses which have been supplied in the market for a long period of time and without modifying the fundamental procedure to mount the exchangeable lens on a camera body.

These and various other objects and features of the present invention may be attained by an exchangeable lens in accordance with the present invention, which includes a transmitting member provided integrally with a diaphragm setting member and being spaced a given distance from a minimum $f$-number indicia on the diaphragm setting member, the transmitting member being capable of transmitting information as to the difference in step between the minimum $f$-number for the lens and a preset $f$-number.

In addition, the exchangeable lens includes an indicia for automatic diaphragm control of the lens positioned on a diaphragm setting member and spaced a given distance from a specific $f$-number position. In a series of exchangeable lenses, the above described distances are constant irrespective of the type of the lens.

In its broadest aspects, therefore, the present invention comprehends an exchangeable lens for use in a single lens reflex camera which includes a camera body and an information receiving member for receiving information from said exchangeable lens, said exchangeable lens comprising a lens barrel containing at least one optical lens and a controllable diaphragm aperture, a fixed index on the surface of said lens barrel, a rotatable diaphragm setting member about the outer peripheral surface of said lens barrel, said diaphragm setting member having thereon an indicia for automatic aperture control and a graduated aperture scale for manual aperture setting, said aperture scale extending from a minimum to a maximum $f$-number of said exchangeable lens, said indicia being spaced a predetermined distance from a specific $f$-number position in the direction in which said aperture scale extends, said diaphragm setting member being settable to any one of the manual aperture setting positions in which any one of the $f$-numbers aligns with said index and to an automatic aperture control position in which said indicia aligns with said index, a single information transmitting member integrally formed with said diaphragm setting member and spaced a predetermined distance from the minimum $f$-number position in the direction in which said scale extends, said information transmitting member being capable of being coupled with said information receiving member upon mounting of said exchangeable lens onto said camera body, whereby said information transmitting member transmits, to said camera through the coupling, information as to the step difference from the minimum to a set $f$-number when said diaphragm setting member is set to any one of the manual aperture setting positions and information as to the minimum $f$-number of said lens when said diaphragm setting member is set to the automatic aperture control position.

A principle incorporated in the present invention will now be described. According to the APEX notation system, the index symbols for use in photographic and computing formulae are as follows: $Bv$ for a luminance value, $Sv$ for a film speed value, $Av$ for an aperture value, and $Tv$ for a time value. As is well known, a proper exposure condition is given as follows:

$$Sv + Bv = Tv + Av$$

In an exchangeable lens automatic TTL light-measuring type camera, a fully open light measuring system is adopted. In this system the object light passes through a fully open diaphragm aperture at an aperture value $Avo$ and is received by a light measuring element. The output $Bvo$ of the light measuring element is used as the basis of automatic exposure computation, wherein $Bvo = Bv - Avo$.

Accordingly, an automatic exposure device for use in a general type diaphragm-priority-automatic-shutter-speed-control camera adopts either one of the following formulae, both of which are combinations of the formulae set forth above:

$$Tv = Sv + (Bv - Avo) - Av + Avo = (Sv + Bvo) - Av + Avo \quad \ldots \text{(I)}$$

$$Tv = Sv + (Bv - Avo) - (Av - Avo) = (Sv + Bvo) - P \ldots \text{(II)}$$

In the camera type which adopts formula (I) in the joint portion of an exchangeable lens to a camera body, two signals representing a preset $f$-number ($Av$) and a minimum $f$-number ($Avo$) are transmitted from the exchangeable lens side to a camera body side. In contrast thereto, in the camera type which adopts formula (II), a diaphragm information, such as the difference in step (P) between a minimum $f$-number and a present $f$-number i.e., only a rotational displacement of a diaphragm setting member at the exchangeable lens, is transmitted.

In the camera type which adopts formula (II), only a single signal (P) is transmitted and thus the manufacturing cost of the lens is lowered. However, the use of this formula is applicable only to a camera of a diaphragm-priority-automatic-shutter-speed control type.

In contrast thereto, a camera which allows for shutter-speed-priority-automatic-diaphragm control, as well as diaphragm-priority-automatic-shutter-speed control, and which adopts only the formula (II), fails to compute a proper aperture value as $Av$ is not included in formula (II), while a camera adopting formula (I) permits automatic diaphragm control and an indication of $f$-number corresponding to an aperture value to be automatically controlled, as is shown by the following automatic exposure computing formula since $Av$ is included in formula (I):

$$Av = (Sv + Bvo - Tv) + Avo \ldots \text{(III)}$$

The aforesaid objects of the present invention may be attained by the combination of an exchangeable lens adopting the formula (II) and a camera body by utilizing the present invention in which a $f$-number corresponding to an aperture value to be automatically controlled may be indicated with the diaphragm maintained in a fully open condition at the time of automatic diaphragm control according to a difference in step (P) between a minimum $f$-number and a preset $f$-number of the lens thereby providing a low cost, reasonable exchangeable lens.

The present invention is based on, among other things, the discovery that:

i. The formula $P = Av - Avo$ may be modified to $Avo = Av - P$, ii. the reference or specific $f$-number and a rotational displacement of a diaphragm setting ring for setting the diaphragm to the specific $f$-number are substituted for $Av$ and $P$, thereby providing $Avc$ and $Pc$ respectively, and iii. when the value of $Pc$ is transmitted to a camera body side, then a proper aperture value for shutter-speed-priority-automatic-diaphragm control may be computed according to the following formula:

$$Av = (Sv + Bvo - Tv) + Avc - Pc \ldots \text{(IV)}$$

In this formula, $Avc$ may be fixed in common for all types of exchangeable lenses according to the present invention so that once the value $Avc$ is fixed, then an $f$-number corresponding to the aforesaid proper aperture value ($Av$) may be indicated only if a value of $Pc$ is determined.

BRIEF DESCRIPTION OF DRAWINGS

FIGS. 2A, 2B, 2C and 2D are partially schematic views of various operation conditions of an exchangeable lens according to the present invention, in which FIG. 2A represents an aperture manual setting condition, and FIGS. 2B, 2C and 2D represent respective automatic diaphragm control conditions for different types of exchangeable lenses; and FIG. 3 is a schematic block diagram of an indicating system provided in the camera body shown in FIG. 1.

DESCRIPTION OF THE PREFERRED EMBODIMENTS

Figure 1:
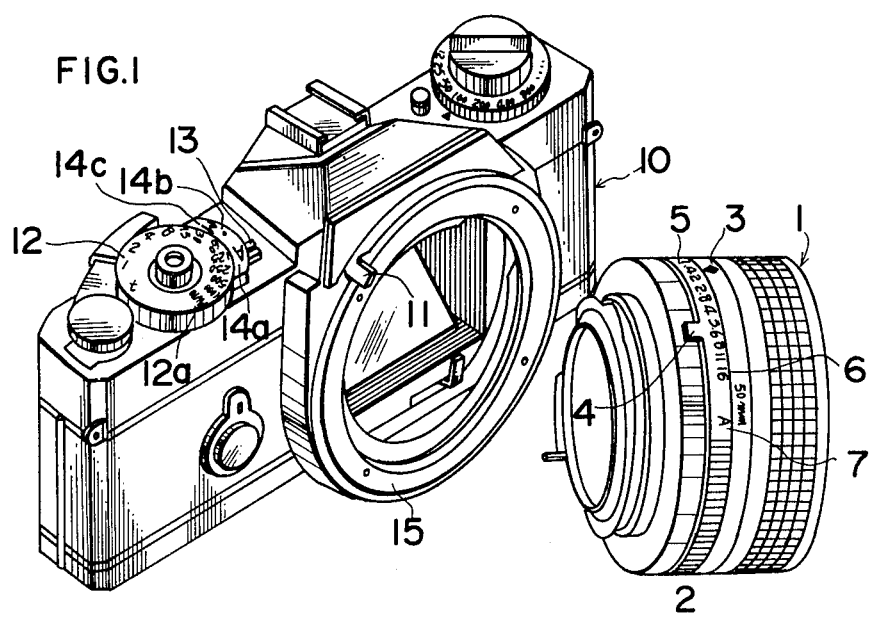
FIG. 1 is a perspective view of an exchangeable lens according to the present invention which shows a condition prior to the lens being mounted on a camera body having shutter-speed-automatic-control means and diaphragm-automatic-control means.

Referring now to FIG. 1, diaphragm setting ring 2 is fitted in a rotatable manner in a given position on the outer peripheral surface of a lens barrel of exchangeable lens 1. An aperture scale of graduations for respective $f$-numbers including a minimum $f$-number 5 for the exchangeable lens 1 is marked on diaphragm setting member 2, here a ring, in opposed relation to diaphragm setting index 3 marked on a fixed portion of a lens barrel. In addition, diaphragm setting ring 2 includes A indicia 7, marked thereon and being spaced apart from the graduations, the indicia for use in setting automatic diaphragm control to be described later. The diaphragm aperture of the lens 1 may be preset by rotating diaphragm setting ring 2 so as to set one of the lens 1 graduations in alignment with diaphragm setting index 3.

Projecting portion 4, which projects from diaphragm setting ring 2, serves as a transmitting member which is adapted to transmit to a camera body side a difference in step between a minimum $f$-number graduation 5 and a preset $f$-number graduation. Projecting portion 4 is spaced a given distance from minimum $f$-number graduation 5. Minimum $f$-numbers for the aforesaid exchangeable lenses vary according to fully open aperature values inherent to exchangeable lenses 1 as shown in FIGS. 2A, 2B, 2C and 2D. As a result, transmitting members 4 for exchangeable lenses having varying fully open aperture values should be positioned at different f-number graduations, respectively, that is, a common distance from the minimum f-number graduation, the graduation 5 indicating a minimum f-number for an exchangeable lens varies depending on the respective exchangeable lenses and is governed by a focal length of an exchangeable lens in general.

In operation in the lens in the shutter-speed-priority-automatic diaphragm control mode, automatic diaphragm control setting graduation indicia 7 is brought into alignment with diaphragm setting index 3 by rotating diaphragm setting ring 2. According to the present invention, automatic diaphragm control setting graduation 7 is spaced a given distance from a given f-number (for instance, f:2.8, f:5.6 or f:8) in each exchangeable lens.

This embodiment, automatic diaphragm control setting graduation 7 is provided in a position corresponding to f:45. The reason for positioning graduation 7 in this particular position is that the most widely used maximum f-number for an exchangeable lens at the present time is f:32. Therefore, if graduation 7 is positioned in the position of f:45, then automatic diaphragm control setting graduation 7 will not be superposed on any of the f-numbers in the scale from a minimum f-number 5 to a maximum f-number 6. In addition, f:45 is only spaced one step from the possible maximum f-number f:32, which thereby minimizes the rotational displacement of diaphragm setting ring 2 in establishing automatic diaphragm control.

A member 11 to be transmitted is provided on camera body 10 in a projecting manner from bayonet peripheral portion 15 of the body towards exchangeable lens 1 and is loaded under the action of spring 16 as shown in FIG. 2 so as to rotate in the counterclockwise direction around peripheral portion 15 of the aforesaid bayonet portion. Member 11 is designed such that when exchangeable lens 1 is mounted on camera body 10, the member engages transmitting member 4 of exchangeable lens 1 all the time. When diaphragm setting ring 2 is rotated, member 11 is caused to move in the direction against the action of spring 16 whereby a rotational displacement of ring 2 relative to the lens barrel may be transmitted to camera body 10.

The following description is for camera body 10 of the mode-change-over type, that is, a camera body in which a diaphragm-priority-automatic-shutter speed control mode may be changed over to a shutter-priority-automatic-diaphragm control mode, and vice versa.

In the camera body of FIG. 1, AUTO graduation 12a for a diaphragm-priority-automatic-shutter-speed control mode is provided on shutter dial 12 in addition to shutter speed graduations. When diaphragm control mode selecting member 13 is set to A index 14a, an automatic diaphragm control mode may be obtained and when the member is set to M index 14c, an automatic control mode may be obtained in which an aperture value is set manually by the photographer. Accordingly, in a diaphragm-priority-automatic-shutter-speed-control mode, the diaphragm has priority over the other, so that diaphragm control mode selecting member 13 is set to M index 14c with AUTO graduation 12a on the shutter dial set to index 14b. In a shutter-speed-priority-automatic-diaphragm control mode, the shutter speed has priority over the other, with the shutter speed graduation on the shutter dial set to index 14b, while diaphragm control mode selecting member 13 is set to A index 14a.

Figure 2A:
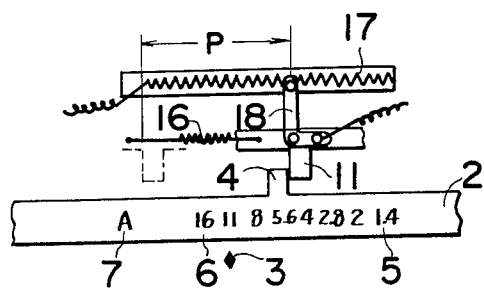

Operation of transmitting member 4 will be described in further detail. FIG. 2A shows the member 4 while in a diaphragm-priority-automatic-shutter-speed control mode where f:11 is aligned with diaphragm setting index 3 to thereby achieve an aperture value of f:11. Member 11 to be transmitted is moved by transmitting member 4 a distance corresponding to the step difference between the minimum f-number (f:1.4 in this lens) and the preset f-number (f:11). Resistor 17 is operated by means of brush 18 integral with member 11 to be transmitted so that a shutter speed commensurate with the aforesaid preset f-number (f:11) is capable of being indicated. The shutter speed control operation in this mode is identical to that in a known diaphragm-priority-automatic-shutter-speed-control camera.

Figure 2B:
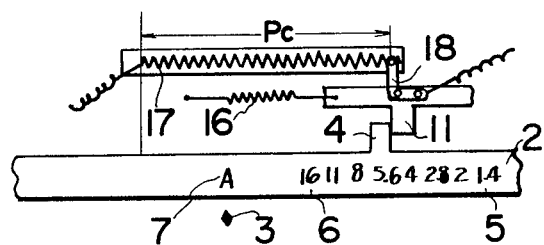

In FIG. 2B, a shutter-speed-priority-automatic-diaphragm-control mode has been established. In this condition, when a shutter speed is set by priority over the other, the automatic diaphragm control is enabled as in the case of a known shutter-speed-priority-automatic-diaphragm-control camera. Then when diaphragm setting ring 2 is set to the automatic diaphragm control position in which "A" indicia 7 aligns with index 3, transmitting member 4 which had previously fed information as to the difference in step between a minimum f-number and a preset f-number in the diaphragm-priority-automatic-shutter-speed-control mode now feeds information as to the minimum f-number itself for exchangeable lens 1, so that an f-number corresponding to an aperture value to be automatically controlled may be indicated.

Figure 2C:
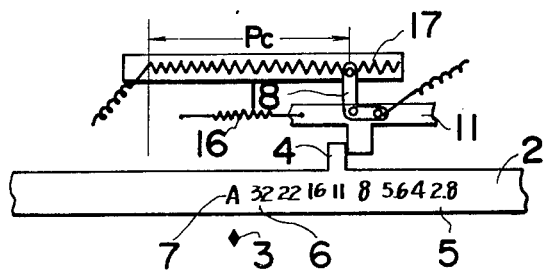
Figure 2D:
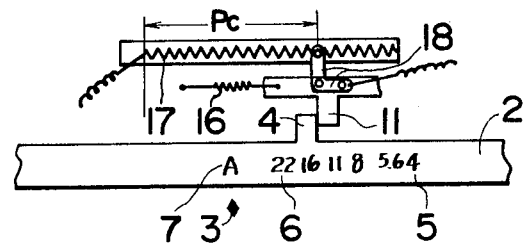

The description will now turn to transmitting member 4 when transmitting information as to a minimum f-number inherent in vario as other exchangeable lenses. In accordance with the present invention and as shown in FIGS. 2C and 2D, automatic diaphragm control setting graduation "A" indicia 7 is provided in each lens in the position corresponding to f:45 on diaphragm setting ring 2, a position which is independent of the maximum f-number 6 for each exchangeable lens. In addition, transmitting member 4 is provided in a position which is spaced a given distance from the minimum f-number 5. Thus when diaphragm setting ring 2 for exchangeable lens 1 is set for automatic diaphragm control by aligning graduation "A" indicia 7 for an automatic diaphragm control mode with index 3, transmitting member 4 moves member 11 to be transmitted a distance commensurate with respective minimum f-numbers for each exchangeable lense, in FIG. B . . . f:1.4, in FIG. C . . . f:2.8, in FIG. D . . . f:4.

The displacement of member 11 corresponds to a difference in step Pc between an aperture value Avo and imaginary aperture value Avc. In other words, $Avo = Avc - Pc$.

In this regard, Avc is a common value for all exchangeable lenses employable in the system according to the present invention, so that once the value Avc is determined for the system, then a minimum f-number for a given lens may be obtained from a value of Pc for the lens. Thus, the determination of a Pc value signifies the determination of a minimum f-number. Information as to the Pc value is transmitted by aligning automatic diaphragm control setting graduation "A" indicia 7 wih index 3, so that a minimum f-number may be thereby transmitted to camera body 10.

Thus, in summary, for calculating a diaphragm aperture value Av for a diaphragm to be controlled, an imaginary diaphragm aperture value Avc should be determined, as can be seen from the formula (III). However, for indicating an f-number corresponding to a diaphragm aperture value Av to be controlled, it suffices to determine a value of Pc.

An indicating operation will be described in detail with reference to FIG. 3. In FIG. 3, light measuring circuit 20 includes photo-sensitive element PD adapted to receive light from an object through an exchangeable lens and a diaphragm aperture and generate a voltage in proportion to the logarithm the intensity of light thus received. A voltage signal representing the film sensitivity of the film used is photographically added to the voltage proportional to the intensity of light whereby circuit 20 generates a voltage signal Vt corresponding to a proper exposure time (shutter speed) which is dependent on the brightness of the object, aperture value, and the film sensitivity.

According to APEX notation system, voltage signal Vt corresponds to Tvo, in the case of fully open aperture light measurement, since $Tvo = Bv + Sv - Avo$, where Avo represents a fully open aperture value of a lens and Tvo represents a time value for the fully open aperture. Voltage signal Vt varies by a given voltage Va for a change which corresponds to one step of an APEX index. One end of variable resistor 17 having a linear characteristic is connected to output end 20a of light measuring circuit 20, while the other end of resistor 17 is connected to constant current source I. A voltage shift down of a voltage Vp from the voltage level at output end 20a commensurate with a rotational displacement of ring 2 is provided by sliding element 18 adapted to be slid on resistor 17 in response to the rotation of diaphragm setting ring 2.

Meanwhile, exposure time setting circuit 22 generates a voltage signal commensurate with an exposure time (shutter speed) set manually. In time setting circuit 22, a constant current flows through variable resistor 23 and slide element 24 is at a position where the length of the resistor corresponds to the set exposure time and thus a voltage signal corresponding to the set exposure time is generated. For example, a voltage signal corresponding to an exposure time of 1/2000 sec is generated from terminal 25. Change-over switch 26 is capable of being changed over in response to exposure control modes. In the case of a shutter-speed-priority-automatic-diaphragm-control mode, the switch 26 is connected to contact 26a and in the case of a diaphragm-priority-automatic-shutter-speed-control mode, the switch is connected to contact 26b.

Indicating device 27 of FIG. 3 is so arranged that when a voltage across input terminals 27a and 27b is one of 0 Va ... 11Va, light emitting diodes $LED_o$, $LED_1$ ... $LED_{11}$ respectively are lit. Alternatively, in place of light emitting diodes ($LED_o$ ... $LED_{11}$), a meter may be used where the position of a light emitting diode corresponding to the aforesaid voltage may be indicated. In principle, indicating device 27 is the same as a meter.

With reference to the aforesaid arrangement as shown in FIG. 3, the indicating operation for a particular f-number in a shutter-priority-automatic-diaphragm-control mode will be described.

Assuming that an exchangeable lens having a minimum f-number of f:1.4 is used with camera body 10, the value of Pc of this lens is 10. Therefore, when the lens is in the automatic diaphragm mode, slide element is shifted a distance corresponding to 10 steps from 18a to 18c as is shown in FIG. 3. Accordingly, the voltage level at brush slide element 18 is lower by 10Va than a voltage level at output terminal 20a in the light measuring circuit.

Assuming that an exposure time to be manually set is the same as an exposure time corresponding to an output voltage in light measuring circuit 20, a proper aperture for the exposure time thus set is a fully opened aperture and therefore the light emitting diode corresponding to the minimum f-number 1.4 should be lit. Meanwhile, the voltage level at output terminal 20a of the light measuring circuit is even with a voltage level at sliding element 24, so that a voltage to be impressed across input terminals 27a and 27b is 10Va which is equal to a voltage across 18a and 18c. Accordingly, light emitting diode $LED_{10}$ is lit to indicate f:1.4.

When a shutter speed to be set thereafter is decreased by nVa as compared with the above case, then the voltage across input terminals 27a and 27b is thereby lowered by nVa and a light emitting diode shown at $LED_{10-n}$ is lit to indicate an f-number which has been shifted by 'N' steps from f:1.4. A similar description may be applied to the situations of other f-numbers.

The description will now be turned to indication of an exposure time in a camera in a diaphragm-priority-automatic-shutter-speed-control mode. In this case, change-over switch 26 is connected to contact 26b and a voltage corresponding to a shutter speed 1/2000 sec is impressed on input terminal 27a. When a voltage signal corresponding to a shutter speed 1/2000 sec is impressed on input terminal 27b, then the voltage across input terminals 27a and 27b becomes zero, so that light emitting diode $LED_o$ is lit. Accordingly, light emitting diode $LED_o$ is used for exposure time 1/2000 sec. When a signal of exposure time 1/1000 sec is fed to input terminal 27b, then the voltage across input terminals 27a and 27b is Va, so that light emitting diode $LED_1$ is lit.

It is apparent from the foregoing, that an exchangeable lens in accordance with the present invention is able to be mounted on a camera body without modification of the bayonet on the transmitting member for transmitting information as to aperture value of the camera body. In addition, the exchangeable lens is capable of providing information to a camera body in both automatic modes of operation by means of a single information transmitting member on the lens. Furthermore, an exchangeable lens of the present invention is capable of indicating an f-number corresponding to an aperture value to be controlled in a diaphragm-priority-automatic-shutter-speed-control camera.

We claim:

1. An exchangeable lens for use in a single lens reflex camera which includes a camera body and an information receiving member for receiving information from said exchangeable lens, said exchangeable lens comprising:

a lens barrel containing at least one optical lens and a controllable diaphragm aperture, a fixed index on the surface of said lens barrel, a rotatable diaphragm setting member about the outer peripheral surface of said lens barrel, said diaphragm setting member having thereon an indicia for automatic aperture control and a graduated aperture scale for manual aperture setting, said aperture scale extending from a minimum to a maximum f-number of said exchangeable lens, said indicia being spaced a predetermined distance from a specific f-number position in the direction in which said aperture scale extends, said diaphragm setting member being settable to any one of the manual aperture setting positions in which any one of the f-numbers aligns with said index and to an automatic aperture control position in which said indicia aligns with said index, a single information transmitting member integrally formed with said diaphragm setting member and spaced a predetermined distance from the minimum f-number position in the direction in which said scale extends, said information transmitting member being capable of being coupled with said information receiving member upon mounting of said exchangeable lens onto said camera body, whereby said information transmitting member transmits, to said camera through the coupling, information as to the step difference from the minimum to a set f-number when said diaphragm setting member is set to any one of the manual aperture setting positions and information as to the minimum f-number of said lens when said diaphragm setting member is set to the automatic aperture control position.

2. An exchangeable lens as defined in claim 1, wherein said indicia is arranged on said diaphragm setting member at the upper end of said aperture scale.

3. An exchangeable lens as defined in claim 1, wherein said information transmitting member includes a projection extending in parallel with the optical axis of said exchangeable lens.

4. A series of exchangeable lenses as defined in claim 1, wherein said indicia for each lens is arranged on said diaphragm setting member at the upper end of said aperture scale.

5. A series of exchangeable lenses as defined in claim 1, wherein said information transmitting member of each lens includes a projection extending in parallel with the optical axis of said exchangeable lens.

6. A series of exchangeable lenses for use in a single lens reflex camera which includes a camera body and in information receiving member for receiving information from an exchangeable lens, each of said exchangeable lenses comprising:

a lens barrel containing at least one optical lens and a controllable diaphragm aperture;

a fixed index on the outer surface of said lens barrel;

a rotatable diaphragm setting member on the outer peripheral surface of said lens barrel having thereon an indicia for automatic aperture control and an aperture scale for manual aperture setting, said aperture scale extending from a minimum to a maximum f-number of said exchangeable lens, said indicia being spaced a predetermined distance from a specific f-number position in the direction in which said aperture scale extends, said diaphragm setting member being settable to any one of the manual aperture setting positions in which any one of the f-numbers aligns with said indexing member and to an automatic aperture control position in which said indicia aligns with said indexing member;

a single information transmitting member integrally formed with said diaphragm setting member and spaced a predetermined distance from the minimum f-number position in the direction in which said scale extends, said information transmitting member being capable of being coupled with said information receiving member upon mounting of said exchangeable lens onto said camera body, whereby said information transmitting member transmits to said cameras through the coupling, information as to the step difference from the minimum to a set f-number when said diaphragm setting member is set to any one of the manual aperture setting positions and information as to the minimum f-number of said lens when said diaphragm setting member is set to the automatic aperture control position, wherein the distance of said indicia from the specific f-number position and the distance of said information transmitting member from the minimum f-number position is the same for each exchangeable lens of said series.

* * * * *